Jan. 11, 1966     B. R. LIPE     3,229,131
DYNAMOELECTRIC MACHINES HAVING SLOT STICK BEARINGS
Filed Feb. 26, 1962

Inventor
Bruce R. Lipe
By Robert B. Benson
Attorney

United States Patent Office 3,229,131
Patented Jan. 11, 1966

3,229,131
DYNAMOELECTRIC MACHINES HAVING SLOT STICK BEARINGS
Bruce R. Lipe, Cincinnati, Ohio, assignor to Allis-Chalmers Manufacturing Company, Milwaukee, Wis.
Filed Feb. 26, 1962, Ser. No. 175,682
9 Claims. (Cl. 310—90)

This invention relates generally to bearings for dynamoelectric machines. More specifically this invention relates to a new slot stick for a dynamoelectric machine that not only retains the windings in the winding slots but supports the rotating elements of the motor.

In conventional dynamoelectric machines the bearings for supporting the rotating shaft and rotor are mounted in the motor housing. Hence, these bearings require a special frame or housing and care must be taken to specifically and carefully align the bearings with the stator so that the rotor of the motor will not rub against the stator during operation.

This invention proposes a new motor that eliminates the conventional bearings and provides a solid lubricating bearing material around the bore of the stator which supports the rotor of the motor as it rotates. This construction eliminates the need for conventional bearings and the associated special mounting structure. Furthermore, it minimizes alignment problems between the rotor and the stator, simplifies the overall construction of the machine and is considerably less expensive. By spacing the solid lubricating bearing material around the inner periphery of the stator, passages are formed therebetween which greatly facilitate the cooling of the motor.

Therefore, it is the object of this invention to provide a new and improved dynamoelectric machine.

Another object of this invention is to provide a new dynamoelectric machine having unique bearing means for supporting the rotor directly.

Another object of this invention is to provide a new and improved slot stick for dynamoelectric machines which also serves as the bearing support for the rotating parts of the machine.

Other objects and advantages will be apparent from the following description when read in connection with the accompanying drawings, in which.

Figure 1:
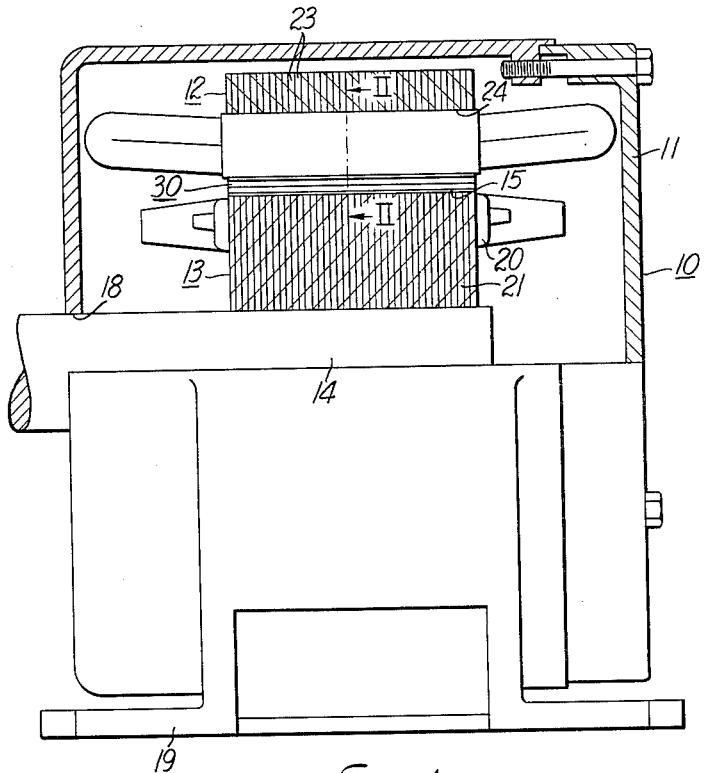
FIG. 1 is a side view partially in section of a dynamoelectric machine embodying the novel bearing means of this invention.

The unique slot stick bearing of this invention is illustrated in an electric motor 10 comprising a housing or yoke 11, a stator 12 mounted within the housing, and a rotor 13 mounted on a shaft 14 for rotation therewith. The rotor 13 is positioned within the bore 15 of the stator and the shaft 14 extends through an opening 18 in the housing 11 to a source of power. The motor has an appropriate support bracket 19 connected to the housing.

The rotor 13 can be of any suitable design but as illustrated in the drawing it is provided with a squirrel cage winding 20 which has been die cast in the core 21 of the rotor. The stator 12 is of conventional design made up of iron laminations 23 having aligned winding slots 24 near the bore 15. The winding slots 24 are generally oval with a neck portion 25 connecting the slot to the bore of the stator. The slots are filled with coils 26 of a distributed winding as is conventional in the art. A suitable liner 27 may be positioned in the slot to separate the windings from the laminations 23.

The novel slot stick 30 of this invention is positioned in the top of the winding slot 24 and extends through the opening at the neck 25 into the bore 15 of the stator for supporting the rotor. The slot stick 30 is made up of a suitable bearing material that is also a good electrical insulator. These materials are frequently referred to in the trade as solid lubricant materials, an example of which is polytetrafluoroethylene resin sold by Du Pont under the trademark Teflon. The slot sticks 30 are positioned in the neck portion 25 of the slots 24 in such a way as to hold the windings 26 within the slots 24 and engage and support the rotor.

Figure 2:
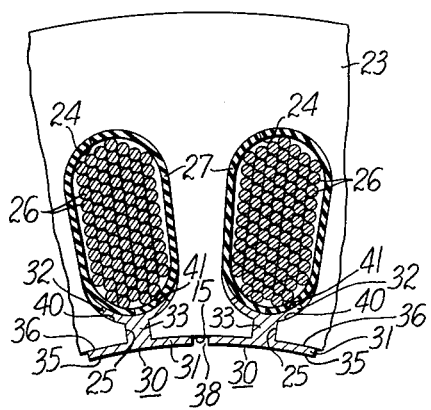
FIG. 2 is a cross section view taken along the line II—II of FIG. 1.

Preferably as shown in FIG. 2, the slot stick 30 is made up of two spaced apart flange members 31, 32 with a connecting member 33 extending therebetween. The stick appears as an "H" when viewed as a cross section transverse to its length. The connecting member 33 is adapted to fit snugly in the neck portion of the slot. The external surface 35 of the first or outer flange member 31 is curved to complement the external surface of the rotor 13. The other surface 36 of the flange member 31 is formed to lie snugly against the bore 15 of the stator 12. The flange members 31 are preferably made so that they are spaced from the adjacent flanges and hence provide longitudinally extending channels 38 between adjacent flanges 31 which act as cooling ducts and thereby facilitate the cooling of the machine.

The inner or second flange member 32 extends outwardly on both sides of the connecting member 33 and has an inner surface 40 which is curved complementary to the surface of the winding slot. The other surface 41 of the second flange member can be of any suitable configuration so long as it performs a function of retaining the windings 26 within the slots 24.

Figure 3:
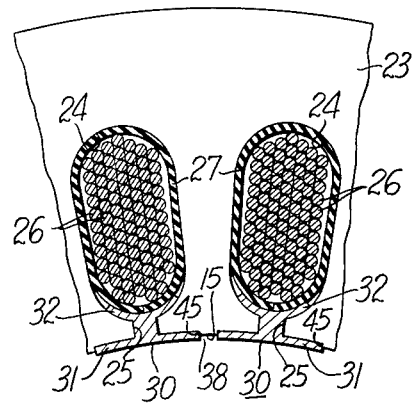
FIG. 3 is a cross section view showing an alternate embodiment of a slot stick of this invention.

An alternate embodiment of the slot stick is shown in FIG. 3. In this arrangement the outer flange 31 of the slot stick 30 fits into a shallow recess 45 in the bore of the stator core. The recess tends to retain the bearing material and prevent it from extruding or flowing under high loads.

In operation the stator core 12 is assembled from the individual laminations 23 and the slots 24 aligned. A slot liner 27 is then positioned in each one of the slots 24 and coils 26 are placed within the slot liners. The open ends of the slot liners are pressed down to form a space between the top of the coils 26 and the top of the slot 24. The slot sticks 30 are then positioned in the slots by inserting the stick in the neck opening 25 at one end of the stator core 12 and forcing it longitudinally until it extends the entire length of the core. When the stator is completely assembled the outer flanges 31 of the slot stick 30 will form a bearing surface that extends around the bore of the stator but is interrupted between adjacent sticks by cooling slots or ducts 38. The inner flanges 32 span the junction of the slot liner 27 and retain the coils 26 within the slots 24.

The rotor 13 is then assembled and positioned within the stator bore 15 where it is entirely supported by the slot stick bearings 30. As the motor is operated a certain amount of lubrication will be provided by the slot stick material to support the rotating shaft and rotor. The lubricating and bearing characteristics of the solid lubricating material, such as Teflon polytetrafluorethylene resin, intended for use in this application are well known in the art.

The embodiment of FIG. 3 operates substantially the same as the embodiment of FIGS. 1 and 2 except that it has additional means for retaining the slot stick in position.

Although but two embodiments of this invention have been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. A dynamoelectric machine comprising: a housing, an annular stator member mounted in said housing, said stator member having a plurality of arcuately spaced winding slots positioned near its bore, windings positioned in said slots, a rotor mounted within said stator, a shaft connected to said rotor and extending through said housing, and slot sticks positioned in said winding slots, said slot sticks being made of a material having good bearing characteristics and electrical insulating characteristics, said sticks extending slightly into the bore of said stator and engaging and supporting said rotor for relative rotation and abutting said windings to retain them within said winding slots.

2. A dynamoelectric machine comprising: a housing, an annular stator member mounted in said housing, said stator member having a plurality of arcuately spaced winding slots positioned near its bore, said slots having neck portions connecting said slots to said bore, windings positioned in said slots, a rotor mounted within said stator, a shaft connected to said rotor and extending through said housing, and slot sticks positioned in said neck portion of said winding slots, said slot sticks being made of a material having good bearing characteristics and electrical insulating characteristics, said sticks extending slightly into the bore of said stator and engaging and supporting said rotor for relative rotation and abutting said windings to retain them within said winding slots.

3. A dynamoelectric machine comprising: a housing, an annular stator member mounted in said housing, said stator member having a plurality of arcuately spaced winding slots positioned near its bore, said slots having neck portions connecting said slots to said bore, windings positioned in said slots, a cylindrical rotor mounted within said stator, a shaft connected to said rotor and extending through said housing, and slot sticks positioned in said neck portion of said winding slots, said slot sticks being made of a material having good bearing characteristics and electrical insulating characteristics, said sticks having a first flanged portion extending slightly into the bore of said stator and engaging and supporting said rotor for relative rotation and a second flanged portion engaging the top of said slots and abutting said windings to retain them within said winding slots.

4. A dynamoelectric machine comprising: a housing, an annular stator member mounted in said housing, said stator member having a plurality of arcuately spaced winding slots positioned near its bore, said slots having neck portions connecting said slots to said bore, windings positioned in said slots, a cylindrical rotor mounted within said stator, a shaft connected to said rotor and extending through said housing, and slot sticks positioned in said neck portion of said winding slots, said slot sticks being made of a material having good bearing characteristics and electrical insulating characteristics, said sticks having a first flanged portion extending slightly into the bore of said stator, the outer surface of said first flange being curved to complement the external curved surface of said rotor and engaging and providing the sole support for relative rotation of said rotor and a second flanged portion engaging the top of said slots and abutting said windings to retain them within said winding slots.

5. A dynamoelectric machine comprising: a housing, an annular stator member mounted in said housing, said stator member having a plurality of arcuately spaced winding slots positioned near its bore, said slots having neck portions connecting said slots to said bore, windings positioned in said slots, a cylindrical rotor mounted within said stator, a shaft connected to said rotor and extending through said housing, and slot sticks positioned in said neck portion of said winding slots, said slot sticks being made of a material having good bearing characteristics and electrical insulating characteristics, said sticks having a first flanged portion extending slightly into the bore of said stator, said first flanges being spaced apart along the bore of said stator to form cooling ducts therebetween, the outer surface of said first flange being curved to complement the external curved surface of said rotor and engaging and supporting said rotor for relative rotation and a second flanged portion engaging the top of said slots and abutting said windings to retain them within said winding slots.

6. A dynamoelectric machine comprising: a housing, an annular stator member mounted in said housing, said stator member having a plurality of arcuately spaced winding slots positioned near its bore, said slots having neck portions connecting said slots to said bore, windings positioned in said slots, a cylindrical rotor mounted within said stator, a shaft connected to said rotor and extending through said housing, and slot sticks positioned in said neck portion of said winding slots, said slot sticks being made of polytetrafluorethylene, said sticks having a first flanged portion extending slightly into the bore of said stator, the outer surface of said first flange being curved to complement the external curved surface of said rotor and engaging and supporting said rotor for relative rotation and a second flanged portion engaging the top of said slots and abutting said windings to retain them within said winding slots.

7. A dynamoelectric machine comprising: a housing, an annular stator member mounted in said housing, said stator member having a plurality of arcuately spaced winding slots positioned near its bore, said slots having neck portions connecting said slots to said bore, windings positioned in said slots, a slot liner surrounding said windings within said slots, a rotor mounted within said stator, a shaft connected to said rotor and extending through said housing, and slot sticks positioned in said neck portion of said winding slots, said slot sticks being made of a material having good bearing characteristics and electrical insulating characteristics, said sticks extending slightly into the bore of said stator and engaging and supporting said rotor for relative rotation and abutting said liners to retain said windings within said winding slots.

8. A dynamoelectric machine comprising: a housing, an annular stator member mounted in said housing, said stator member having a plurality of arcuately spaced winding slots positioned near its bore, said slots having neck portions connecting said slots to said bore, the surface of said stator defining said bore having shallow recesses on either side of said necks, windings positioned in said slots, a cylindrical rotor mounted within said stator, a shaft connected to said rotor and extending through said housing, and slot sticks positioned in said neck portion of said winding slots, said slot sticks being made of a material having good bearing characteristics and electrical insulating characteristics, said sticks having a first flanged portion extending slightly into the bore of said stator and fitting into said recesses in said stator, the outer surface of said first flange being curved to complement the external curved surface of said rotor and engaging and supporting said rotor for relative rotation and a second flanged portion engaging the top of said slots and abutting said windings to retain them within said winding slots.

9. A slot stick for a core of a dynamoelectric machine having winding slots terminating in a neck portion that opens to the bore of the core comprising: a longitudinally extending member that is H-shaped in cross section taken transverse to its length, said member being adapted to fit into the neck portion of a winding slot of the core of a dynamoelectric machine and extend into the bore of the core, said member being made of a material having good bearing and electrical insulating characteristics.

References Cited by the Examiner

UNITED STATES PATENTS

| | | | |
|---|---|---|---|
| 1,896,328 | 2/1933 | Pohl | 310—87 |
| 2,201,699 | 5/1940 | Myers | 310—214 |
| 2,251,816 | 8/1941 | Arutunoff | 310—87 |
| 2,569,278 | 9/1951 | Barth | 310—214 |
| 2,993,131 | 7/1961 | Trevitt | 310—86 |
| 3,157,939 | 11/1964 | Balke | 310—214 X |

ORIS L. RADER, *Primary Examiner.*

MILTON O. HIRSHFIELD, *Examiner.*